Dec. 26, 1961 R. H. AYMAR ETAL 3,014,278
DENTAL HANDPIECE
Filed Aug. 21, 1959

INVENTOR
ROBERT H. AYMAR
EARL R. WEINER

BY Karl W. Flocks
ATTORNEY

United States Patent Office 3,014,278
Patented Dec. 26, 1961

3,014,278
DENTAL HANDPIECE
Robert H. Aymar, Silver Spring, and Earl R. Weiner, Baltimore, Md., assignors to We-Mar, Inc., Baltimore, Md., a corporation of Maryland
Filed Aug. 21, 1959, Ser. No. 835,293
3 Claims. (Cl. 32—27)

The present invention relates to a dental handpiece that is operated by an air driven turbine, and more particularly to such a handpiece in which the body that carries the head is made into a front part and a rear part and in which metal fluid conducting tubes in the body extend only as far back as the first or forward part of the body.

A major change in the equipment used by dentists has come about in recent years with the advent of a dental drill or handpiece that is operated by compressed air. This newly accepted type of handpiece relies upon the driving of a turbine by the compressed air, and is largely supplementing and/or supplanting the preceding type of drill which was belt driven.

The wide acceptance of the air driven drill has come about because of the higher rotational speeds obtainable with it, as compared with the speeds obtainable with the belt-driven drill. Currently used air driven drills operate, for example, at speeds between 150,000 r.p.m. and 300,000 r.p.m.

The dental drill, or handpiece as it is called, is made in several embodiments. All embodiments of the contra-angle type of handpiece have, however, a head and a body. The head is generally cylindrical and contains the air turbine which is rotatably supported by bearings contained in the head. These bearings are generally ball bearings, and the turbine shaft is configured to receive the dental tool, such as a bur. Extending generally transversely of the head is the body, the body usually being approximately circular in cross-section and of extended length, so that it may be readily grasped in the hand of the dentist and so that it has adequate balance.

Two constructions of the body part of the drill or handpiece are known, one construction being made of a solid bar provided with longitudinally extending passages for the compressed air, for return or exhaust air, and for water to be sprayed on the tooth. The drilling of these rather long and small diameter passages presents considerable difficulty in production, these passages usually being drilled into the bar stock. The drilling of long passages of small diameter is difficult, especially on a production basis, as the long drills required have a tendency to angle away from the desired course and come out of the stock for the body at the side thereof. This, of course, ruins the body in which this occurs and accordingly results in high wastage.

In the other type of handpiece that is widely used, the body is made from tube stock, and the passages for the compressed air and the water are provided by metal tubes that are contained within the body tube. These metal tubes extend from the vicinity of the head to the end of the handpiece body, and at this end are connected with flexible air and water lines extending from a source of air under pressure and a source of water, respectively. Typically, the air tubes and water tubes, as well as the body tube, has been made of a brass or brass-like metal and the flexible air line and water line have been made of a rubber or plastic substance.

While this latter type of construction has proven to be more readily fabricated than the solid bar construction first mentioned, it has been found in practice that certain difficulties have arisen after these handpieces have been in serivce. In particular, many handpieces have failed due to the breaking off of the water tubes and/or air tubes within the body tubes of the handpieces.

It has now been discovered that the breaking of the air tube and/or water tube within the body is due to vibrations set up in the handpiece because of inaccuracies in the bearings that support the turbine shaft. While these ball bearings are generally of high quality workmanship, their manufacturing tolerances permit a certain amount of eccentricity and/or nonsymmetry, which is the cause of vibrations in the head. The body being connected directly, or indirectly, to the head, it is similarly vibrated and the vibratory motion is passed on to the water and/or air tubes. As a consequence, vibrations of these tubes cause the metal thereof to become fatigued and to fail.

An object of the present invention is to provide an air turbine handpiece in which breakage of fluid supply tubes is avoided.

Another object of the present invention is the provision of an air turbine handpiece which is easily manufactured and which gives long, trouble-free service.

Still another object of the present invention is to provide an air turbine handpiece in which fluid supply tubes are not subjected to destructive vibrations.

Yet another object of the present invention is the provision of an air turbine handpiece in which vibration and consequent failure of fluid supply tubes are eliminated.

Other objects and the nature and advantages of the instant invention will be apparent from the following description taken in conjunction with the accompanying drawings, wherein.

Figure 1:
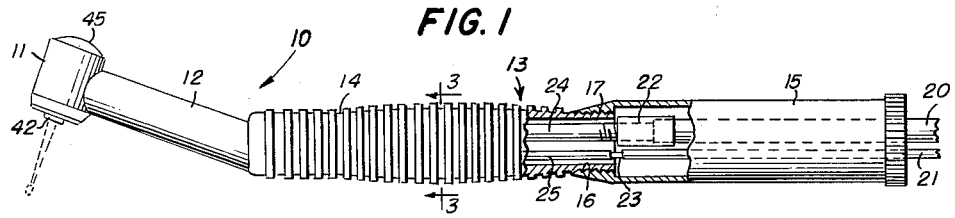
FIG. 1 is an elevational view, with parts in section, of a handpiece in accordance with the present invention.

Referring now to the drawings, wherein like reference numerals are used to designate like or corresponding parts throughout the several views, there is shown in FIG. 1 a handpiece 10 comprising a head 11, a neck tube 12 and a two-part body 13. The forward part 14 of body 13 is secured to the neck tube 12, and the rear part 15 of the body 13 has screw threads 16 at the forward end thereof by means of which it is connected to similar screw threads 17 at the rear end of front part 14.

The rear part 15 is generally in the form of a tube, and has an opening at the rear end thereof through which pass a flexible air line 20 and a flexible water line 21. The air line 20 and water line 21 are made of a suitable substance, such as plastic or rubber, and extend to a source of compressed air and a source of water, respectively. A tubular connector 22 extends over the end of air line 20, and over the rear end of metallic, preferable brass, air tube 24. A similar tubular connector 23 extends into the end of water line 21, and also into the end of water tube 25. Water tube 25 is metallic, like air tube 24.

It will be noted that the rear ends of air tube 24 and water tube 25 are approximately adjacent the rear end of forward part 14 of the body 13, and are thus considerably foreshortened from known air tube and water tube constructions.

Figure 3:
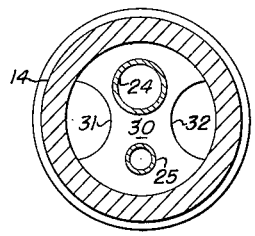
FIG. 3 is an enlarged cross-sectional view taken on the line 3—3 of FIG. 1.

As is clearly seen in FIG. 3, the air tube 24 and water tube 25 are supported within the forward part 14 of body 13 by a spider 30, spider 30 having cut-away portions 31 and 32 to permit egress of exhaust air from the head 11 and out the rear end of the handpiece 10.

Figure 4:
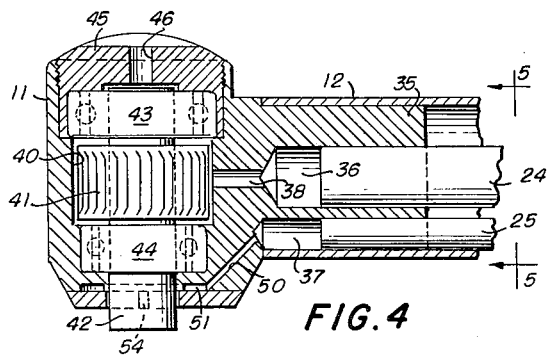
FIG. 4 is an enlarged cross-sectional view taken on the line 4—4 of FIG. 2.

At its forward end, forward part 14 is secured, as by soldering, to neck tube 12, the forward end of which has inserted thereinto a neck block 35 that is integral with head 11. Air tube 24 may be seen in FIG. 4 to be inserted part way into a passage 36 in neck block 35, and water tube 25 may be seen to be similarly inserted into a passage 37 in neck block 35. A reduced jet bore 38 connects passage 36 with a chamber 40 in head 11, the chamber 40 containing a turbine 41 having a shaft 42 that is supported in ball bearings 43 and 44 that are in turn carried in the head 11. Shaft 42 is axially bored, for the reception of a tool (not shown in FIG. 4) and a screw-threaded cap 45 has a hole 46 therethrough to permit ready ejectment of the tool carried by the shaft 42.

Figure 6:
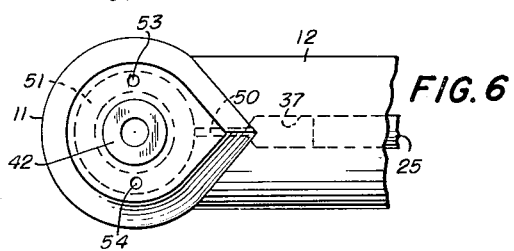
FIG. 6 is a plan view, from below, of the head shown in FIG. 4.

A connecting passage 50 serves to communicate the passage 37 with an annular groove 51, which may be seen in FIG. 6 to have the two water outlet orifices 53 and 54 extending through the bottom of head 11 thereinto.

Figure 5:
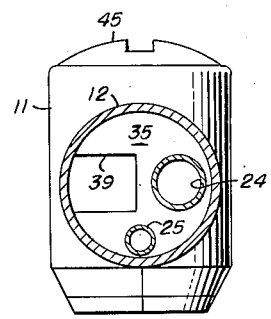
FIG. 5 is a cross-sectional view taken on the line 5—5 of FIG. 4.

In FIG. 5 there may be seen the neck tube 12, air tube 24 and water tube 25, and a slot 39 in neck block 35 for exhaust air from the turbine 41.

Figure 2:
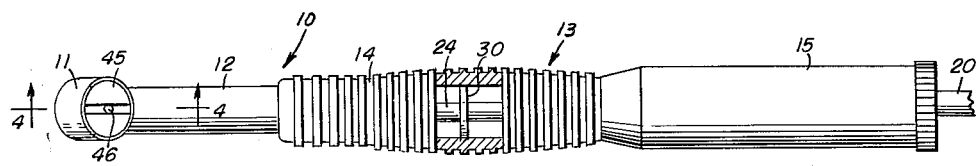
FIG. 2 is a plan view of the handpiece in FIG. 1, with parts in section.

Referring to FIGS. 1 and 2, it may be seen that the forward part 14 of body 13 is generally barrel-shaped, with the exterior diameter at the approximate midpoint thereof being relatively large compared to the exterior diameter at the ends thereof.

In operation, the handpiece 10 is furnished with a suitable tool, such as a bur, inserted into the turbine shaft 42, and the air line 20 and water line 21 are suitably connected to a source of compressed air and water, respectively. Compressed air flowing through the air line 20 will enter the air tube 24 and pass through passage 36 and jet bore 38, to thereby drive the turbine 41. Turbine 41 will rotate at the high rates of speed above mentioned, and as a consequence there will be set up in the bearings 43 and 44 a certain amount of vibration. This vibration will pass into the head 11, neck block 35, neck tube 12 and into the body 13. Because of the vibrations of these parts, there will be a tendency to cause vibration of the air tube 24 and water tube 23, but these latter two tubes will not be subjected to destructive vibrations, primarily because of the short length thereof, these tubes extending only for the distance from the neck block 35 to the rear end of forward part 14 of the body. In particular, resonant vibrations are avoided with the present construction, and vibrations are considerably dampened or lessened due to the barrel shape of forward part 14, above mentioned.

Exhaust air from the turbine will return through the slot 39 in neck block 35 and will pass within neck tube 12, but exteriorly of air tube 24 and water tube 23, and will pass through the cut-away portions 31 and 32 in spider 30, and so will exhaust out of the rear end of rear part 15. Water supplied through water tube 23 will pass through the passage 50 and groove 51, and will discharge through orifices 53 and 54.

There has been provided a dental handpiece of the air turbine type that is readily and economically manufactured from conventional tube stock by known methods. The handpiece of the present invention avoids destructive vibration of the air tube and water tube passing (partly) therethrough because of the relative shortness thereof and/or because of the barrel shape of the forward part of the body, the two-piece construction of the body lending support to the beneficial effect.

It will be obvious to those skilled in the art that various changes may be made without departing from the spirit of the invention and therefore the invention is not limited to what is shown in the drawings and described in the specification but only as indicated in the appended claims.

What is claimed is:

1. A dental handpiece comprising a head having a fluid operated turbine therein, said turbine being adapted to be connected with a driven tool, said head having a neck block extending therefrom, a neck tube having said neck block in one end thereof, a body secured to said neck tube at the other end thereof, said body comprising a forward part having the front end thereof secured to said neck tube and a rear part generally coaxial with said forward part, the front end of said rear part being screw-threaded to the rear end of said forward part, said forward part having a relatively large exterior diameter approximately midway between the ends thereof and merging into smaller diameters at the ends thereof, said rear part being open at the rear end thereof, and a flexible air line and a flexible water line entering the rear end thereof and extending therethrough, and a metal air tube and a metal water tube connected to said air line and water line, respectively, and extending from approximately the rear end of said forward part through said forward part and said neck tube and into openings in said neck block.

2. A dental handpiece comprising a head having a fluid operated turbine therein, said turbine being adapted to be connected with a driven tool, a body connected to said head and comprising a forward part and a rear part generally coaxial with said forward part, the front end of said rear part being detachably connected to the rear end of said front part, said forward part having a relatively large exterior diameter approximately midway between the ends thereof and merging into relatively smaller diameters at the ends thereof, said rear part being open at the rear end thereof and having a flexible air line and a flexible water line entering the rear end thereof and extending therethrough, and a metal air tube and a metal water tube connected to said air line and water line, respectively, and extending approximately the length of said forward part through said forward part to said head.

3. A dental handpiece comprising a head having a fluid operated turbine therein, said turbine being adapted to be connected with a driven tool, said head having a neck block extending therefrom, a neck tube having said neck block in one end thereof, a body secured to said neck tube at the other end thereof, said body comprising a forward part having the front end thereof secured to said neck tube, and a rear part generally coaxial with said forward part, the front end of said rear part being detachably connected to the rear end of said forward part, said forward part having a relatively large exterior diameter approximately midway between the ends thereof and merging artculately along its length into relatively smaller diameters at the ends thereof, and metal air and water tubes extending from said neck block to the rear end of said forward part through said body.

References Cited in the file of this patent

UNITED STATES PATENTS

| 2,866,267 | Fletcher et al. | Dec. 30, 1958 |
| 2,937,444 | Kern | May 24, 1960 |

FOREIGN PATENTS

| 219,562 | Australia | Mar. 6, 1958 |